United States Patent

Dissett

Patent Number: 5,664,656
Date of Patent: Sep. 9, 1997

[54] CENTRIFUGAL CLUTCH

[75] Inventor: Walter L. Dissett, Farmington Hills, Mich.

[73] Assignee: Dyneer Corporation, Warren, Mich.

[21] Appl. No.: 696,067

[22] Filed: Aug. 13, 1996

[51] Int. Cl.$^6$ ............................................. F16D 43/24
[52] U.S. Cl. ............................ 192/105 CD; 192/103 B; 192/209; 464/71
[58] Field of Search ................ 192/105 CD, 103 B, 192/30 V, 209; 464/71

[56] References Cited

U.S. PATENT DOCUMENTS

| | | | |
|---|---|---|---|
| 5,046,593 | 9/1991 | Collins et al. | 192/18 A |
| 5,048,657 | 9/1991 | Dissett et al. | 192/105 CD |
| 5,503,261 | 4/1996 | Schultz | 192/105 CD |
| 5,575,371 | 11/1996 | Gonda et al. | 192/30 V X |

OTHER PUBLICATIONS

Carrier Transicold Phoenix Xtra Brochure of Jul. 1989.
Thermo King SB–III Max Brochure of Apr., 1992.
Thermo King RD–II Brochure of Feb., 1993.

*Primary Examiner*—Andrea L. Pitts
*Attorney, Agent, or Firm*—Laubscher & Laubscher

[57] ABSTRACT

A centrifugal clutch for a transport refrigeration system including an engine and a compressor is characterized by an improved drive connection between the clutch and the compressor. The clutch includes a rotor assembly connected with the engine, a housing centrifugally activated for rotation with the rotor assembly, and a coupling adaptor for transmitting rotation of the housing to a drive shaft of the compressor. The rotor assembly, housing coupling adaptor, and drive shaft are all coaxially arranged. The housing contains a plurality of radial rubber bushings for receiving drive pins which pass through radial openings in the coupling adaptor and which extend parallel to the axis of the adaptor. The drive pins and bushings minimize noise and vibrations within the clutch and prevent radial forces from being delivered to the compressor drive shaft.

6 Claims, 1 Drawing Sheet

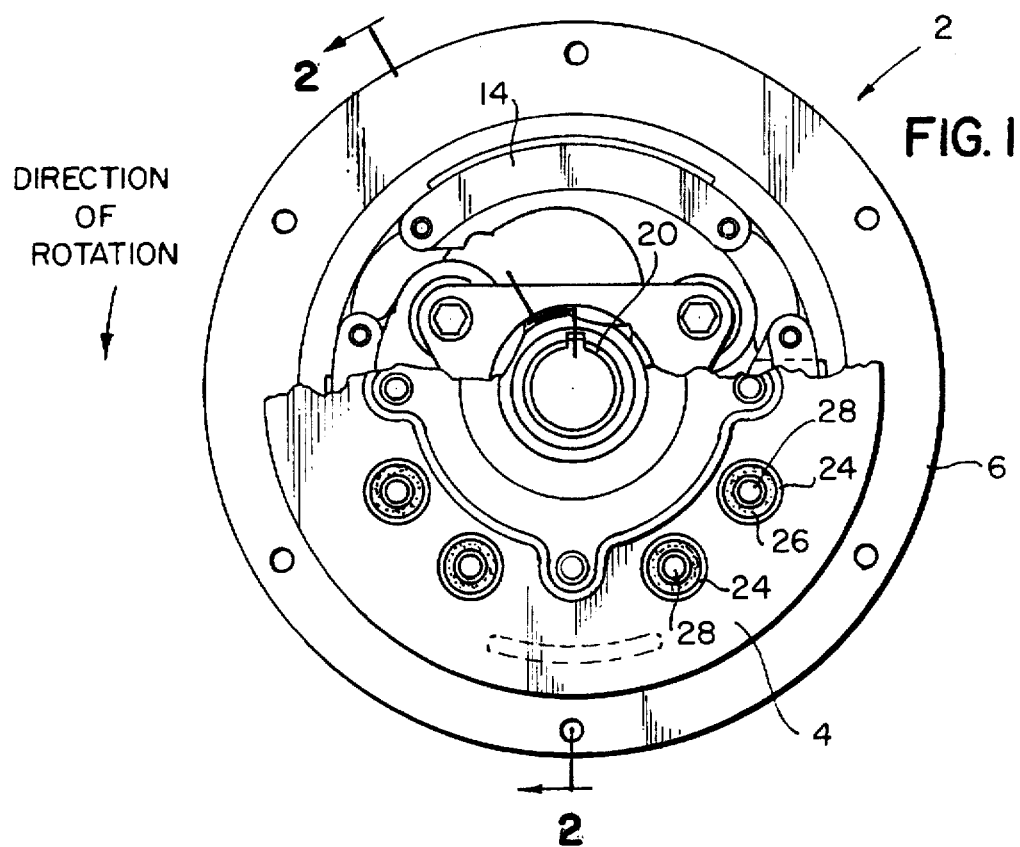
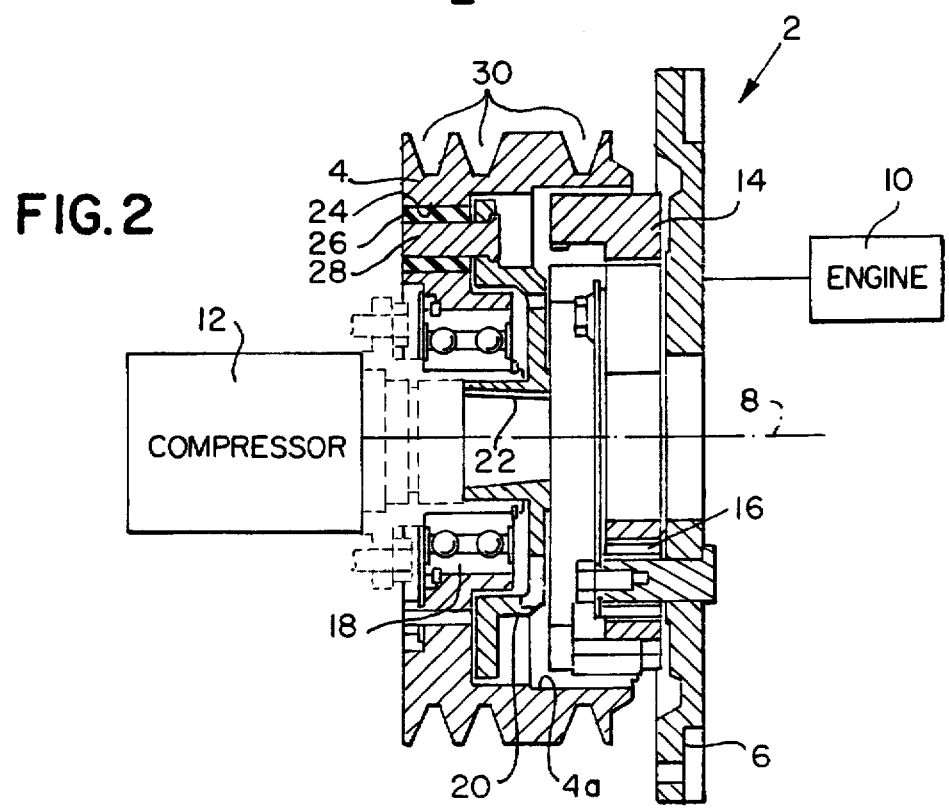

CENTRIFUGAL CLUTCH

BACKGROUND OF THE INVENTION

Refrigerated trucks and trailers include a compressor which is normally driven off a diesel engine that is remote from the engine of the vehicle. A clutch can be located between the engine and the compressor that allows an auxiliary electric motor to drive the compressor when the diesel engine is shut down. That is, the electric motor is used when the truck or trailer is sitting overnight and electrical power for the auxiliary source is available. The diesel engine is used to run the compressor when the vehicle is traveling over the road. The clutch also allows the engine to develop enough speed and torque to rotate the compressor. Without the proper engine torque, the resistance to rotation of the compressor could possibly stall the engine.

There are two different arrangements for connecting the engine with the compressor of a transport refrigeration system. In an in-line close coupled arrangement, the engine and compressor are directly coupled via a clutch or a coupler. The rotor assembly of the clutch is connected with the engine and the housing is connected with the compressor. In a remote mount arrangement, the engine and compressor are not in line with each other. The rotor assembly of the clutch is connected with the engine and the clutch housing is mounted on the rotor assembly via a bearing. A belt is attached to the clutch housing for driving a pulley that is remotely connected with the compressor. A second (or the same) belt is connected to the electric motor stand by when available.

The present invention relates to an improved centrifugal clutch for use between the engine and compressor of a close coupled transport refrigeration system.

BRIEF DESCRIPTION OF THE PRIOR ART

It is known in the art to provide a centrifugal clutch between the engine and compressor of a transport refrigeration system with the clutch housing connected with the compressor drive shaft either directly of through a belting system and the rotor assembly connected with the engine. A major drawback of the known centrifugal clutches is that the belts used to rotate the housing from an auxiliary motor could impart a radial force on the compressor drive shaft which would cause the sleeve bearing in the compressor to fail.

An improved clutch was then developed in which a coupling adaptor was provided for connection with the compressor drive shaft. The adaptor includes a plurality of internal spur gear teeth that mate with an external spur gear in the housing. The spline joint was designed with enough clearance to drive the compressor without adding the radial load from the belts to the auxiliary motor. However, with this improved clutch, the spline joint was metal on metal and unacceptable noise and vibrations occurred in the clutch.

The present invention was developed in order to overcome these and other drawbacks of the prior art by providing an improved drive connection between the coupling adaptor and the housing of a centrifugal clutch for use in a transport refrigeration system.

SUMMARY OF THE INVENTION

According to a primary object of the invention, a centrifugal clutch arranged between an engine and a compressor of a transport refrigeration system includes a rotor assembly connected with the engine for rotation about a longitudinal axis, a housing coaxial with the rotor assembly, and a centrifugally actuated engagement mechanism for rotating the housing with the rotor assembly when the rotor assembly reaches a selected speed. A coupling adaptor is provided within the clutch coaxial with the rotor assembly and is connected with the drive shaft of the compressor. A plurality of drive pins are provided to connect the coupling adaptor with the housing. The drive pins have axes parallel to the longitudinal axis so that rotation of the housing is transmitted to the compressor drive shaft via the adaptor without a radial component.

According to a more specific embodiment of the invention, the housing contains a plurality of openings containing rubber bushings for receiving the drive pins to reduce noise and vibrations within the clutch. The flexibility of the rubber bushings allows the radial load of the V-belts to be absorbed by the bushings and not placed on the the compressor shaft.

According to another object of the invention, the housing outer surface contains at least one V-groove for receiving a V-belt connected with an auxiliary motor. Thus, when the engine is not operating, the auxiliary motor can be used to rotate the housing and drive the compressor via the coupling adaptor without providing a radial force to the compressor drive shaft.

BRIEF DESCRIPTION OF THE FIGURES

Other objects and advantages of the invention will become apparent from a study of the following specification when viewed in the light of the accompanying drawing, in which:

FIG. 1. is a partially cut-away front plan view of the centrifugal clutch according to the invention; and FIG. 2. is a sectional view taken along line 2—2 of FIG. 1.

DETAILED DESCRIPTION

As shown in the drawing, the centrifugal clutch 2 according to the invention includes a housing 4 and a rotor assembly 6 which are coaxially arranged for rotation about a longitudinal axis 8.

The clutch is arranged between the engine 10 and the compressor 12 of a transport refrigeration system such as found on a truck or trailer.

The rotor assembly 6 is connected with the engine flywheel and thus is rotated by the engine when the engine is running. A friction shoe assembly 14 is connected with the rotor assembly 6 via a bushing 16. The friction shoe assembly engages an inner surface 4a of the housing 4 as the result of centrifugal forces generated upon rotation of the rotor assembly. Accordingly, when the rotor assembly reaches a selected rotational speed, the housing is engaged and is rotated with the rotor assembly.

The housing 4 is connected with the compressor 12 via a bearing assembly 18. More particularly, the compressor includes a drive shaft (not shown) which is connected with an annular coupling adaptor 20. The compressor drive shaft and coupling adaptor are coaxially arranged with the housing and rotor assembly. The coupling adaptor includes a slot 22 for receiving a key on the compressor drive shaft so that the coupling adaptor will rotate the drive shaft.

A characterizing feature of the invention is the drive connection between the housing 4 and the coupling adaptor 20. As shown in FIGS. 1 and 2, the housing 4 contains a plurality of radially arranged openings 24 within which are provided bushings 26 preferably formed of a pliable, semi-rigid material such as rubber. The bushings 26 each receive a drive pin 28 which is pressed into a corresponding opening in the coupling adaptor 20. As shown in FIG. 2, the drive pins have longitudinal axes which are parallel to the axis 8 of the housing and rotor assembly. Because the pins and bushings are spaced around the axis of the compressor drive shaft, only rotational forces are transmitted to the shaft. That is, no radial force is applied to the compressor shaft, and the radial force is absorbed through the bushing. Moreover, the rubber bushings 26 minimize noise and vibration within the clutch.

When the engine is not running, such as when the transport vehicle is parked overnight, it is important that the compressor be kept running to preserve the refrigerated environment within the truck or trailer. For this purpose, an auxiliary electric motor (not shown) is provided which can be plugged into an electrical supply at the site where the vehicle is parked. The housing 4 contains one or more circumferential V-grooves 30 in its outer surface for receiving V-belts (not shown) connected with the auxiliary electric motor. The motor is activated to rotate the housing 4 (with the rotor assembly 6 remaining stationary) which in turn rotates the coupling adaptor 20 via the drive pins 28 to turn the compressor drive shaft.

Even though the V-belts have the tendency to impart a radial force on the housing 4, the bushing/drive pin/coupling adaptor assembly of the centrifugal clutch according to the invention prevents the radial force from being delivered to the compressor drive shaft, thereby prolonging the life of the sleeve bearing within the compressor.

As opposed to the prior metal-on-metal spline connection between the coupling adaptor and housing, the present invention minimizes noise, improves the ease of manufacture and assembly of the clutch, thereby reducing costs, and the clutch.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A centrifugal clutch arranged between an engine and a compressor of a transport refrigeration system, comprising
    (a) a rotor assembly connected with the engine and having a longitudinal axis, said rotor assembly being rotated about said axis by the engine;
    (b) a housing coaxial with said rotor assembly;
    (c) centrifugally actuated means for rotating said housing in response to rotation of said rotor assembly above a selected speed;
    (d) an annular coupling adaptor coaxial with said rotor assembly and connected with a drive shaft of the compressor; and
    (e) a plurality of radially arranged drive pins for connecting said coupling adaptor with said housing, said drive pins having axes parallel to said longitudinal axis, respectively, whereby rotation of said housing is transmitted to the compressor drive shaft via said coupling adaptor without a radial component.

2. A centrifugal clutch as defined in claim 1, wherein said housing contains a plurality of radial openings for receiving said drive pins.

3. A centrifugal clutch as defined in claim 2, wherein a plurality of bushings are arranged in said housing openings, respectively, for receiving said drive pins.

4. A centrifugal clutch as defined in claim 3, wherein said bushings are formed of a rubber type material, whereby excessive noise and vibrations between said coupling adaptor and said housing are eliminated.

5. A centrifugal clutch as defined in claim 4, wherein said housing outer surface contains at least one V-groove, whereby an auxiliary motor can be connected with said housing via at least one V-belt to rotate said housing and said compressor drive shaft when the engine is off.

6. A centrifugal clutch as defined in claim 5, wherein said centrifugally actuated rotating means comprise a friction shoe assembly connected with said rotor assembly.

* * * * *